US011033152B2

(12) United States Patent
Parrini

(10) Patent No.: US 11,033,152 B2
(45) Date of Patent: Jun. 15, 2021

(54) SET COMPRISING A PLURALITY OF MUTUALLY CONNECTED COFFEE GRINDERS

(71) Applicant: SIMONELLI GROUP S.P.A., Belforte del Chienti (IT)

(72) Inventor: Mauro Parrini, Porto Sant'Elpidio (IT)

(73) Assignee: SIMONELLI GROUP S.P.A., Belforte del Chienti (IT)

( * ) Notice: Subject to any disclaimer, the term of this patent is extended or adjusted under 35 U.S.C. 154(b) by 138 days.

(21) Appl. No.: 16/367,803

(22) Filed: Mar. 28, 2019

(65) Prior Publication Data

US 2019/0328177 A1 Oct. 31, 2019

(30) Foreign Application Priority Data

Apr. 26, 2018 (IT) ......................... 102018000004860

(51) Int. Cl.
| | | |
|---|---|---|
| *A47J 42/44* | (2006.01) | |
| *A47J 31/06* | (2006.01) | |
| *A47J 31/40* | (2006.01) | |
| *A47J 42/40* | (2006.01) | |
| *A47J 42/00* | (2006.01) | |

(52) U.S. Cl.
CPC .............. *A47J 42/44* (2013.01); *A47J 31/06* (2013.01); *A47J 31/404* (2013.01); *A47J 42/00* (2013.01); *A47J 42/40* (2013.01)

(58) Field of Classification Search
CPC ...................................................... A47J 42/44
See application file for complete search history.

(56) References Cited

U.S. PATENT DOCUMENTS

| 3,550,657 | A | * | 12/1970 | Swanke | .................. | A47J 42/26 |
| | | | | | | 241/199.1 |
| 5,718,163 | A | | 2/1998 | Termini | | |
| 6,895,381 | B1 | | 5/2005 | Selby | | |
| 8,800,432 | B2 | * | 8/2014 | Erba | ..................... | A47J 31/525 |
| | | | | | | 99/285 |
| 2011/0094391 | A1 | | 4/2011 | Erba et al. | | |
| 2014/0366743 | A1 | * | 12/2014 | Radhakrishnan | ....... | A47J 31/42 |
| | | | | | | 99/286 |
| 2015/0136496 | A1 | * | 5/2015 | Rego | ....................... | A47J 42/44 |
| | | | | | | 177/132 |
| 2016/0345778 | A1 | * | 12/2016 | Oddera | .................... | A47J 42/00 |
| 2017/0119202 | A1 | * | 5/2017 | Ottavi | ..................... | A47J 42/40 |

OTHER PUBLICATIONS

Search Report Form IT237 "Written Opinion" dated Jan. 18, 2019 with reference to the priority Italian Patent Application No. IT 102018000004860.

* cited by examiner

*Primary Examiner* — Adam J Eiseman
*Assistant Examiner* — P Derek Pressley

(57) ABSTRACT

A set includes a plurality of coffee grinders, each coffee grinder including: a body, a grinding unit, actuation means to activate the grinding unit, a load cell to weigh a filter holder, and booking means to book the activation of the coffee grinder; the set has a central control unit to receive a booking signal from the booking means of each coffee grinder and create an ordered list with an activation sequence of the coffee grinders; the central control unit is connected to the load cell of all coffee grinders to send an activation command of the load cell to a coffee grinder at a time according to the sequence indicated by the ordered list.

8 Claims, 3 Drawing Sheets

SET COMPRISING A PLURALITY OF MUTUALLY CONNECTED COFFEE GRINDERS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present patent application for industrial invention relates to a set comprising a plurality of mutually connected coffee grinders.

2. Description of Related Art Including Information Disclosed Under 37 CFR 1.97 and 37 CFR 1.98

As it is known, sets of coffee grinders are often disposed on the same worktop in bars, cafeterias and restaurants, which are suitable for operating in parallel in order to satisfy the request of ground coffee that is necessary to prepare coffee-based drinks. As a matter of fact, public establishments often have a high number of orders for coffee-based drinks and therefore one coffee grinder may not be sufficient to grind the necessary amount of coffee beans, especially in peak hours.

The coffee grinders of the prior art generally comprise a body comprising an inlet for introducing coffee beans in the body and an outlet for dispensing the ground coffee from the body.

Advantageously, the coffee beans are contained in a hopper that is connected to the body in correspondence of the inlet.

The coffee grinder of the prior art comprises a grinding unit disposed in the body to grind to coffee beans that are introduced in the body. Actuation means are connected to the grinding unit to activate the grinding unit.

The coffee beans are introduced in the body through the inlet. The actuation means drive the grinding unit into rotation in such a way to grind the coffee beans.

The ground coffee comes out through the outlet. A filter holder is disposed under the outlet, in such a way that the ground coffee falls in the filter holder.

In order to weigh the ground coffee, the coffee grinder of the prior art generally comprise a load cell comprising an upward protruding arm that is suitable for supporting the filter holder in projecting position. In this way, the amount of ground coffee that falls in the filter holder can be measured.

The set of coffee grinders according to the prior art is impaired by a drawback due to the fact that the provision of multiple coffee grinders, which are positioned on the same worktop and are simultaneously operated, reduces the accuracy of the weighing operation of the filter holder because of the presence of vibrations caused by the movement of the actuation means and of the grinding unit of the other coffee grinders. As a matter of fact, while grinding the coffee beans, the coffee grinders generate vibrations that are transmitted to the worktop. Consequently, the vibrations also interfere with the load cell of the other coffee grinders, which is no longer capable of correctly weighing the filter holder.

In particular, the vibrations that affect the weighing of the filter holder are low frequency vibrations because their frequency is close to the frequency of the load cell.

An incorrect measure of the weight of the filter holder involves an incorrect measure of the empty filter holder, i.e. the tare, and an incorrect measure of the filter holder when the container is filled with the ground coffee.

The incorrect measure of the weight of the filter holder when the container is filled with the ground coffee implies that the doses of ground coffee used to fill the container of the filter holder are different from time to time, originating drinks with different aromas.

It must be noted that the coffee grinders of the set can be disposed on different worktops in mutual contact. Also in this case, the vibrations generated by a coffee grinder during grinding are transmitted to the other coffee grinders, affecting the operation of the load cell of said coffee grinders.

U.S. Pat. No. 5,718,163 discloses an electronic apparatus for coffee grinding and metering control.

US2011094391 discloses an apparatus for refilling the filter holders of an espresso coffee machine with selected doses of ground coffee.

The purpose of the present invention is to overcome the drawbacks of the prior art by disclosing a set comprising a plurality of coffee grinders, each of them being capable of weighing the filter holder in a precise, accurate way, in order to dispense always the same amount of ground coffee.

Another purpose is to disclose a set comprising a plurality of coffee grinders, each of them being capable of correctly weighing the filter holder, reducing the effect of the vibrations on the load cell.

These purposes are achieved according to the invention with the characteristics of the appended independent claim 1.

Advantageous embodiments appear from the dependent claims.

BRIEF SUMMARY OF THE INVENTION

The set of the invention comprises a plurality of coffee grinders.

Each coffee grinder comprises a body with an inlet for introducing coffee beans in the body and an outlet for dispensing the ground coffee from the body.

Each coffee grinder comprises a grinding unit disposed in the body to grind the coffee beans, and actuation means connected to the grinding unit to move the grinding unit.

Each coffee grinder comprises a load cell suitable for supporting a filter-holder disposed under the outlet in order to weigh the filter-holder.

The peculiarity of the set of coffee grinders according to the invention consists in the fact that each coffee grinder comprises booking means to book the activation of the coffee grinder.

The set of coffee grinders of the invention comprises a central control unit that is directly or indirectly connected to the booking means of all coffee grinders to receive a booking signal from the booking means of all coffee grinders, and create an ordered list with an activation sequence of the coffee grinders based on the order in which the central control unit receives the booking signal from the booking means. The central control unit is directly or indirectly connected to the load cell of all coffee grinders to send an activation command of the load cell to a coffee grinder at a time according to the sequence indicated in the ordered list.

BRIEF DESCRIPTION OF THE SEVERAL VIEWS OF THE DRAWINGS

For the sake of clarity, the description of the set of coffee grinders according to the invention continues with reference to the attached drawings, which have a merely illustrative, not limiting value, wherein.

DETAILED DESCRIPTION OF THE INVENTION

Figure 1:
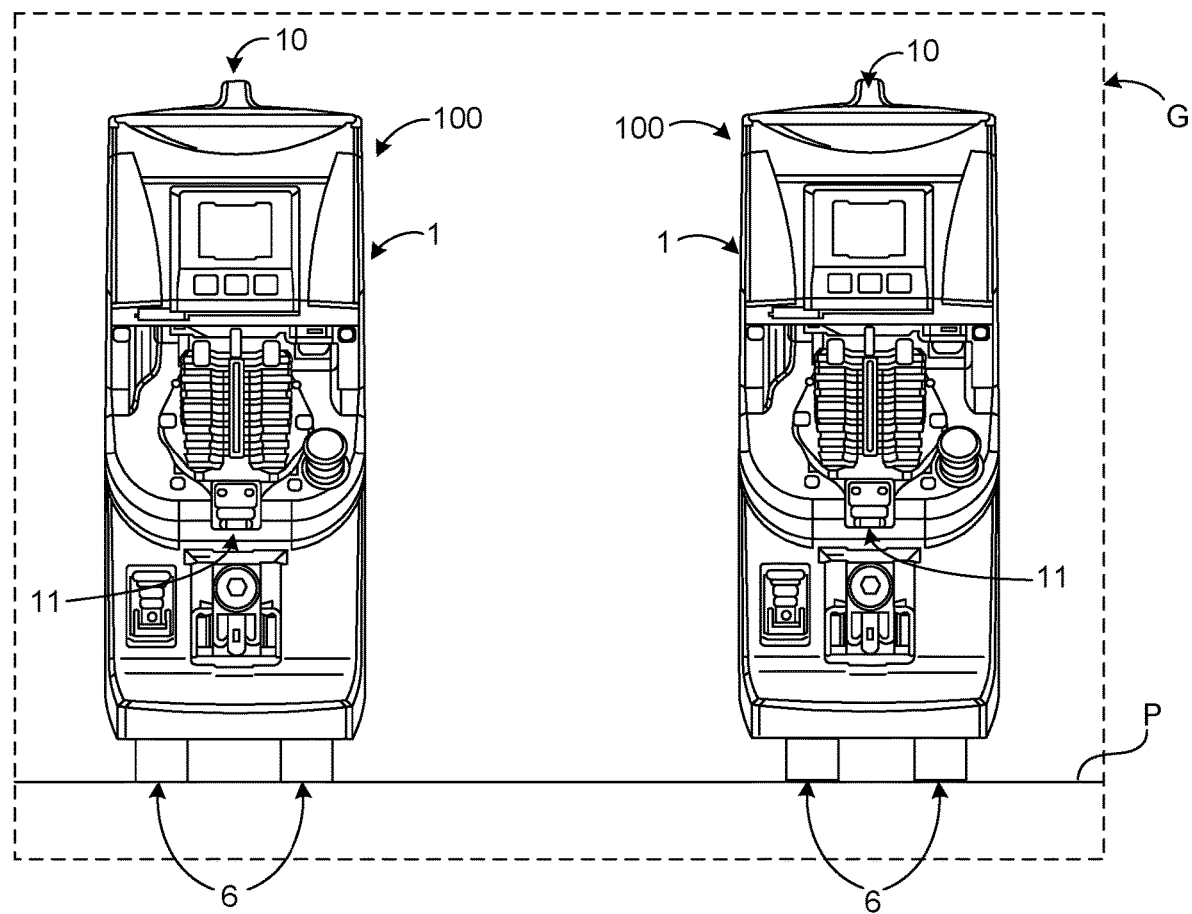
FIG. 1 is a diagrammatic front view of the set of coffee grinders according to the invention.
Figure 2:
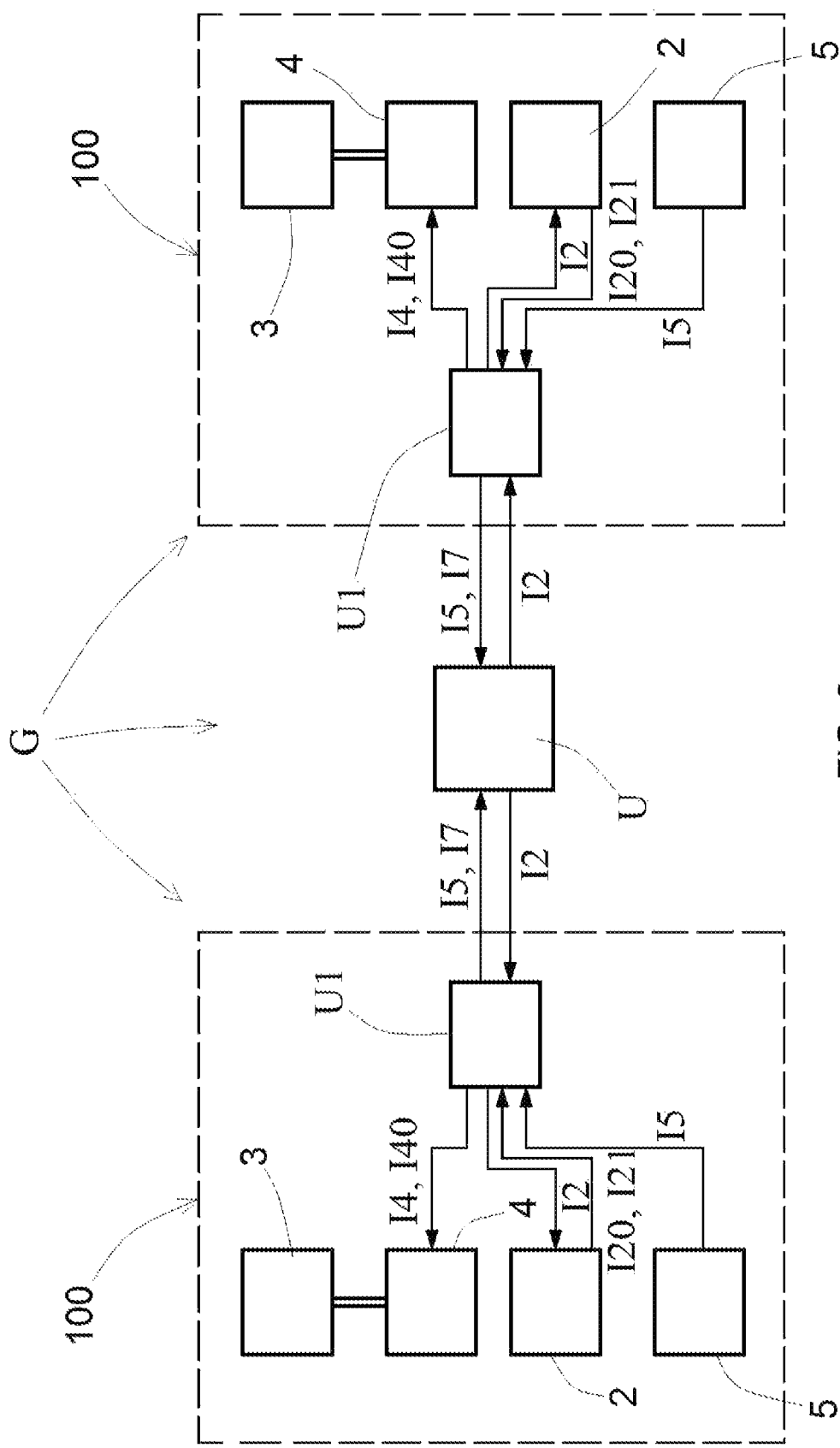
FIG. 2 is a block diagram that shows the connections between the components of the set of coffee grinders according to the invention.

With reference to FIGS. 1 and 2, a set of coffee grinders according to the invention is disclosed, which is generally indicated with reference numeral (G).

The set of coffee grinders (G) comprises two or more coffee grinders (100) that are positioned on the same worktop (P) or on different worktops (P), but in mutual contact. Each coffee grinder (100) comprises a body (1) with an inlet (10) for introducing coffee beans in the body (1) and an outlet (11) for dispensing the ground coffee from the body (1).

Each coffee grinder (100) comprises a grinding unit (3) disposed in the body (1) to grind the coffee beans. The grinding unit (3) comprises spaced out blades that define a gap in communication with the inlet (10) to introduce coffee beans in the gap and with the outlet (11) to dispense ground coffee from the body (1).

Each coffee grinder (100) comprises actuation means (4) connected to the grinding unit (3) to activate the grinding unit (3). More precisely, at least one blade of the grinding unit (3) is rotary and is connected to the actuation means (4), in such a way that the actuation means (4) drive the rotary blade into rotation.

Each coffee grinder (100) comprises a load cell (2) suitable for supporting a filter-holder disposed under the outlet (11) in order to weigh the filter-holder both when it is empty and during refilling.

Each coffee grinder (100) comprises connection means (not shown in the figures) disposed on the load cell (2) to connect the filter holder to the load cell (2).

Each coffee grinder (100) comprises booking means (5) to book the activation of the coffee grinder (100). The booking means (5) can be of automatic or manual type.

If the booking means (5) are of manual type, the booking means (5) consist in a button that is advantageously disposed on the body (1) of the coffee grinder (100) and suitable for being manually pressed by a user when the coffee grinder (100) is ready to be activated, i.e. when the filter holder is on the load cell (2) under the outlet (11) of the body (1).

If the booking means (5) are of automatic type, the booking means (5) consist in a presence sensor to detect the presence of the filter holder on the load cell (2) under the outlet (11). Advantageously, the presence sensor is a proximity sensor disposed in correspondence of the connection means.

The set of coffee grinders (G) comprises a central control unit (U) that is directly or indirectly connected to the booking means (5) of all coffee grinders (100) to receive a booking signal (I5) from the booking means (5) of each coffee grinder (100), and create an ordered list with an activation sequence of the coffee grinders (100) based on the order in which the central control unit (U) receives the booking signal (I5) from the booking means (5). The central control unit (U) is directly or indirectly connected to the load cell (2) of all coffee grinders (100) to send an activation command (I2) of the load cell to a coffee grinder (100) at a time according to the sequence indicated by the ordered list.

Advantageously, each coffee grinder (100) comprises a control unit (U1) connected to the central control unit (U) and to the load cell (2) of the coffee grinder (100) to receive the activation command (I2) from the central control unit (U) to activate the load cell (2). Moreover, the control unit (U1) of each coffee grinder (100) is connected to the booking means (5) of the coffee grinder (100) to send the booking signal (I5) generated by the booking means (5) of the coffee machine (100) to the central control unit (U).

The control unit (U1) of each coffee grinder (100) is also connected to the actuation means (4) to activate the actuation means.

Otherwise said, when a coffee grinder (100) is ready to be activated, the booking means (5) sends a booking signal (I5) to the control unit (U1) of the coffee grinder (100).

The control unit (U1) of the coffee grinder (100) sends the booking signal (I5) to the central control unit (U).

The central control unit (U) puts the coffee grinder (100) at the end of the ordered list, in such a way to generate an activation sequence of the coffee grinders (100).

The central control unit (U) sends the activation command (I2) only to the control unit (U1) of the coffee grinder to be activated, i.e. the first coffee grinder of the ordered list.

The control unit (U1) of the coffee grinder to be activated transmits the activation command (I2) to the load cell (2) of the coffee grinder.

The load cell (2) starts weighing the empty filter holder and sends the weight information (I20) of the empty filter holder to the control unit (U1) of the coffee grinder.

The control unit (U1) sends an activation command (I4) to the actuation means (4), in such a way that the coffee beans are ground.

The ground coffee falls in the filter holder. Simultaneously, the load cell (2) weighs the filter holder with the ground coffee and sends the weight information (I21) of the filter holder to the control unit (U1) of the coffee grinder. When the weight of the filter holder with the ground coffee coincides with a piece of information about the weight of the full filter holder stored in the control unit (U1) of the coffee grinder, the control unit (U1) sends a stop command (I40) to the actuation means (4).

The control unit (U1) of the coffee grinder sends a stop grinding signal (I7) to the central control unit (U), in such a way that the central control unit (U) sends the activation command (I2) to the next coffee grinder (100).

The advantages of the set of coffee grinders according to the invention are manifest, wherein the provision of the booking means permits to activate the coffee grinders sequentially. In view of the above, each coffee grinder can weigh the filter holder without being affected by the presence of vibrations generated by the other coffee grinders.

Figure 3:
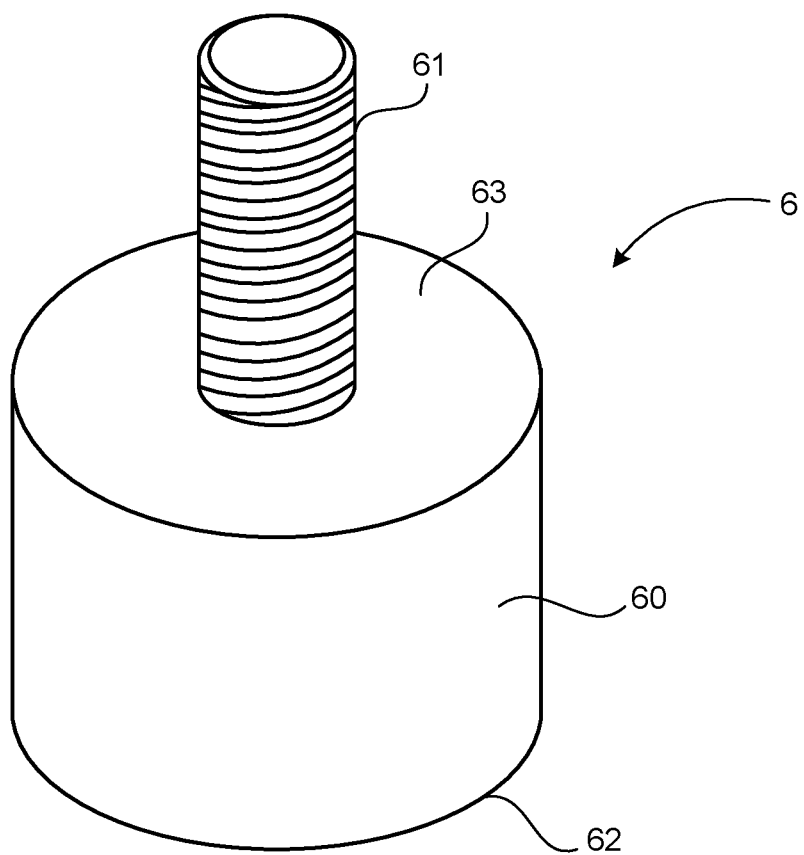
FIG. 3 is an axonometric view of an anti-vibration foot of a coffee grinder of the set of coffee grinders according to the invention.

With reference to FIGS. 1 and 3, each coffee grinder (100) comprises anti-vibration feet (6) connected in lower position to the body (1) of each coffee grinder (100) to support the body (1) and dampen the vibrations of the body (1).

Each anti-vibration foot (6) comprises a cylindrical rubber body (60) with a vertical axis. The body (60) of the anti-vibration foot (6) comprises an upper surface (63) facing the body (1) of the coffee grinder (100) and a lower surface (62) suitable for being disposed on the worktop (P). The lower surface (62) is advantageously coarse in such a way to create friction with the worktop (P).

Each anti-vibration foot (6) comprises a threaded screw (61) that protrudes upwards from the body (60) of the anti-vibration foot (6). The body (1) of the coffee grinder (100) comprises threaded holes with vertical axis, wherein the threaded screws (61) of the anti-vibration feet (6) are screwed.

It must be noted that, as an alternative to the threaded screw, the anti-vibration foot (6) can comprise a plug that is inserted in a hole of the body (1) of the coffee grinder, or a hole that houses a plug or a screw of the body (1) of the coffee grinder.

Because of the provision of the anti-vibration foot, the effects of the vibrations on the load cell can be reduced. In fact, being made of rubber, the body (60) of the horizontal foot (6) absorbs the vibrations, which are not transmitted to the load cell (2) of the coffee grinder (100).

Although it is not shown in the figures, the coffee grinder (100) may comprise only one anti-vibration foot (6). Also the body (1) of each coffee grinder (100) may comprise only one threaded hole (15).

Numerous variations and modifications can be made to the present embodiment of the invention, which are within the reach of an expert of the field, falling in any case within the scope of the invention as disclosed by the appended claims.

I claim:

1. An assembly comprising:
    a plurality of coffee grinders, wherein each of said plurality of coffee grinders comprises:
        a body having an inlet adapted to allow introduction of coffee beans into said body and an outlet adapted to allow dispensing of ground coffee from said body;
        a grinder disposed in said body and adapted to grind the coffee beans;
        an actuator connected to said grinder and adapted to activate grinding of said grinder;
        a load cell disposed under the outlet and adapted to support a filter-holder so as to weigh the filter-holder; and
        a booker adapted to book an activation of said grinder; and
    a central control unit directly or indirectly connected to said booker of all of said plurality of coffee grinders, said central control unit configured to receive a booking signal from each of said plurality of coffee grinders and to create an ordered list with an activation sequence of said plurality of coffee grinders according to an order in which said central control unit receives the booking signal from said booker, said central control unit being directly or indirectly connected to said load cell of all of said plurality of coffee grinders and configured to send an activation command to said load cell of one coffee grinder at a time of said plurality of coffee grinders according to the activation sequence of the ordered list such that said plurality of coffee grinders are operated individually and never simultaneously.

2. The assembly of claim 1, wherein said booker has a presence sensor adapted to detect a pressure of the filter-holder under the outlet of said body.

3. The assembly of claim 1, wherein said booker is a button.

4. The assembly of claim 1, wherein each coffee grinder of said plurality of coffee grinders has a control unit connected to said central control unit and to said load cell in order to receive the activation command from said central control unit in order to active said load cell, wherein the control unit of each coffee grinder is connected to said booker so as to send the booking signal to said central control unit.

5. The assembly of claim 1, wherein at least one coffee grinder of said plurality of coffee grinders has an anti-vibration foot at a lower position of said body so as to support said body and to dampen vibrations of said body.

6. The assembly of claim 1, wherein the anti-vibration foot is a rubber body.

7. The assembly of claim 5, wherein said body of the at least one coffee grinder of said plurality of coffee grinders has a threaded hole with a vertical axis, said anti-vibration foot having a threaded screw that is screwed into the threaded hole of said body.

8. The assembly of claim 5, wherein the anti-vibration foot has a coarse lower surface.

* * * * *